Inventor
Edward W. Miller

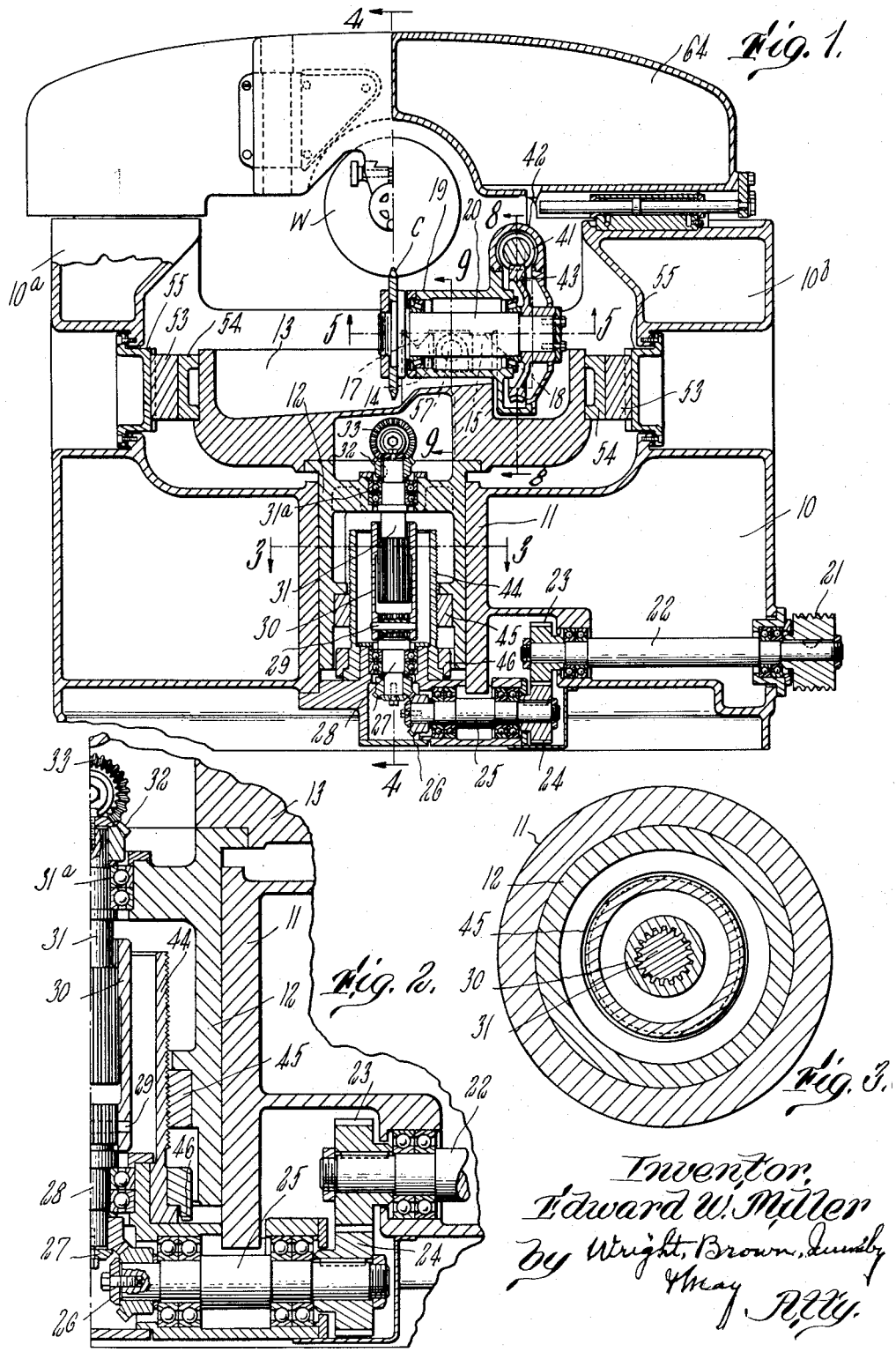

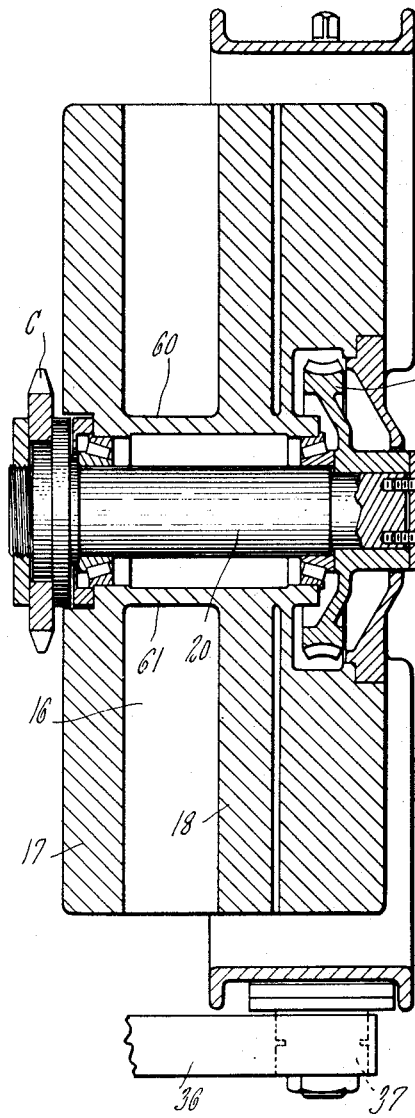
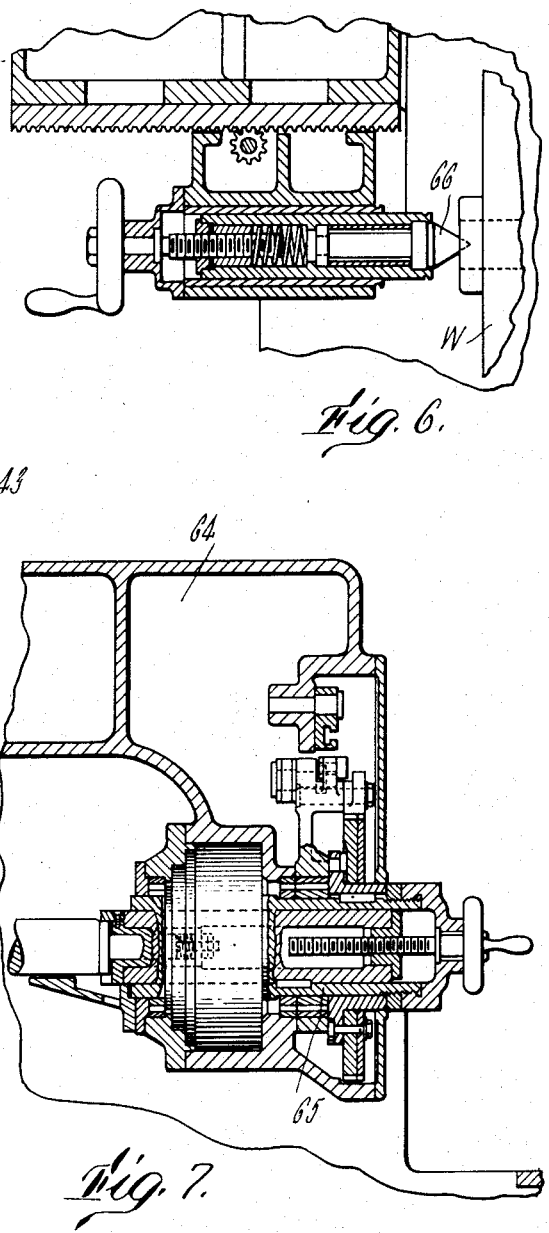

Patented Nov. 17, 1953

2,659,277

UNITED STATES PATENT OFFICE 2,659,277

MACHINE FOR CUTTING OR FINISHING GEAR TEETH AND ANALOGOUS FORMATIONS

Edward W. Miller, Springfield, Vt., assignor to The Fellows Gear Shaper Company, Springfield, Vt., a corporation of Vermont Application July 21, 1945, Serial No. 606,441

5 Claims. (Cl. 90—3)

This invention relates to machine tools in which a rotary cutter is actuated to cut initially, or finish previously rough cut, grooves or spaces in a work piece, or fashion surfaces of other character capable of being formed or generated by rotating cutting tools with relative translative displacement between the cutter and the work piece on which the cutter is acting lengthwise of the work piece. Its primary object is to control and correlate the means for rotating the cutter with means for imparting a relative reciprocative movement of translation between the cutter and work piece in such manner that the cutting speed of the cutter relative to the work is uniform during such translative movements in both directions. A further object is to cut or finish the teeth of gears by means of a milling cutter with transferral of the cutting action back and forth in the axial direction of the gear and performance of cutting during both directions of reciprocation. A still further object is to combine those above mentioned with a generative action whereby teeth may be cut in a circular work piece conjugate to a rack by means of a cutter having a rack tooth profile at its cutting periphery.

Although a part of my object is concerned with the form-cutting or the generation of gear teeth, the whole object is not so limited, but is concerned with the cutting of grooves and spaces in work pieces other than gears and the formation of other surfaces than those of gear teeth. For instance, the production of such parts as ratchets, clutch elements, splined shafts, and other articles of more or less similar nature is within the purpose and scope of the invention.

The principles, and one embodiment, of the invention are illustrated in the following description and accompanying drawings with reference to a machine specifically designed for cutting gears. The features novel with this invention are here shown as applied to a machine having many of the structural characteristics and operating means of that shown in my patent of the United States No. 2,387,166, granted October 16, 1945, entitled Automatic Gear Grinding Machine, the new features being substituted for the cutters and related parts of the prior machine.

Such novel principles, features and combinations include means for effecting back and forth reciprocation of the cutter while rotating it, means for correlating its speed of rotation with its translative traverse in a manner to make the cutting speed uniform, means for effecting a depth feed of the cutter with respect to the work, and other particulars hereinafter described in detail.

In the drawings,

Fig. 1 is a vertical section of the machine before referred to, showing a portion of the machine in front elevation;

Fig. 2 is a fragmentary sectional view showing on a larger scale part of the cutter driving mechanism shown in Fig. 1;

Fig. 3 is a detail cross section on line 3—3 of Figs. 1 and 4;

Fig. 5 is a horizontal section taken on line 5—5 of Figs. 1 and 4, viewed in the direction of the arrows applied to that line;

Figs. 6 and 7 are sectional views showing details of the dead center and spindle, respectively, by which the work is supported;

Figure 8:
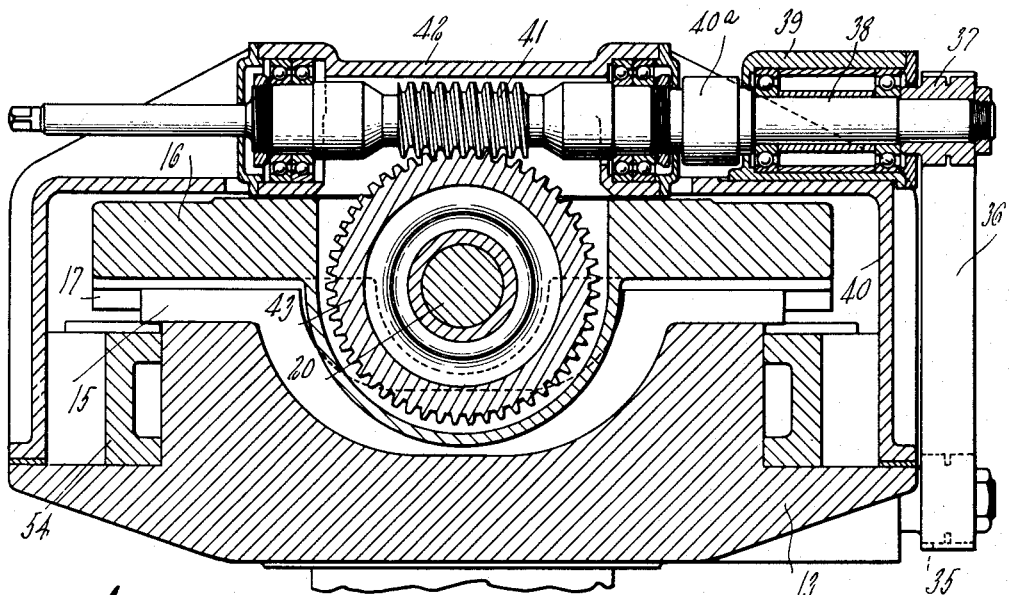
Figure 9:
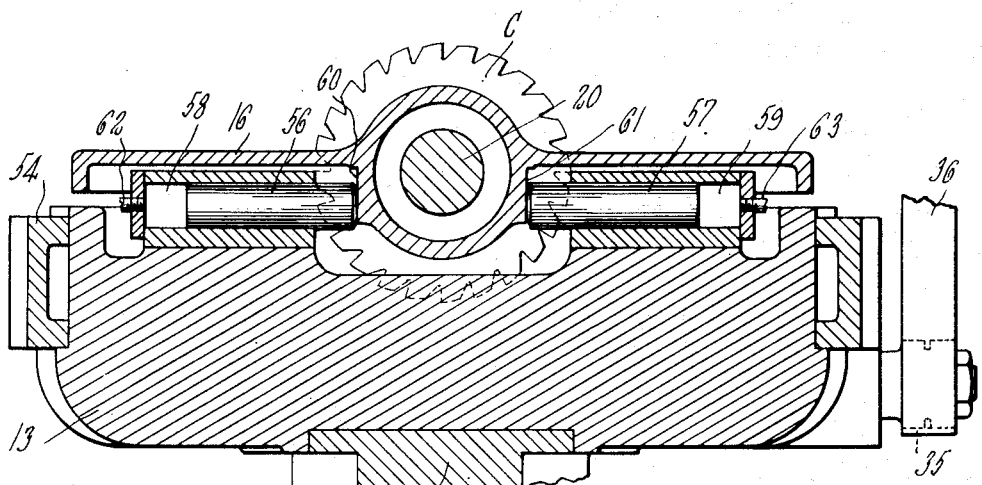

Figs. 8 and 9 are detail cross sections taken on lines 8—8 and 9—9, respectively, of Fig. 1.

Like reference characters designate the same parts wherever they occur in all the figures.

The cutting tool C here shown is a milling cutter having peripheral teeth of which the cutting edges, or their projections on radial planes of the cutter, have the outlines of a rack tooth. This cutter is supported on a base structure 10 with provisions for vertical adjustment and depth feeding movements, rotation about its axis, and reciprocating movement in a horizontal path perpendicular to its axis. The base includes a central vertical guideway 11 in which is mounted a slide 12 carrying on its upper end a stool or cutter carriage base 13. The stool is provided with guideways 14 and 15 on which is supported a slide or cutter carriage 16 provided on its under side with ribs 17 and 18 resting on the guideways. The carriage 16 includes a spindle housing 19 in which a spindle 20 is rotatably mounted. This spindle is arranged with its axis perpendicular to the direction in which the guideways extend, and it protrudes at one end from the housing, carrying there the cutter C. The stool, carriage and spindle together constitute a cutter holder or carrier.

Rotation is imparted to the cutter spindle 20 by a motor or a countershaft (not shown, but which may be located in any convenient relation to the machine), coupled by a belt to a pulley 21 (Fig. 1) on a shaft 22. This shaft carries a gear 23 meshing with a gear 24 on a transmission shaft 25. A bevel gear 26 on the latter shaft meshes with a bevel gear 27 on an upright shaft 28 which rotates in bearings in the machine base and is connected by splines and a pin 29 with an upright sleeve 30. An alined upright shaft 31 is rotatably mounted in a bearing 31a carried by the slide 12 and is contained in sleeve 30 and coupled therewith by longitudinal splines which permit endwise movement of shaft 31 relative to sleeve 30 while transmitting rotation. The assemblage of shaft 28, sleeve 30, and shaft 31 constitutes a telescopic torque-transmitting shaft.

Figure 4:
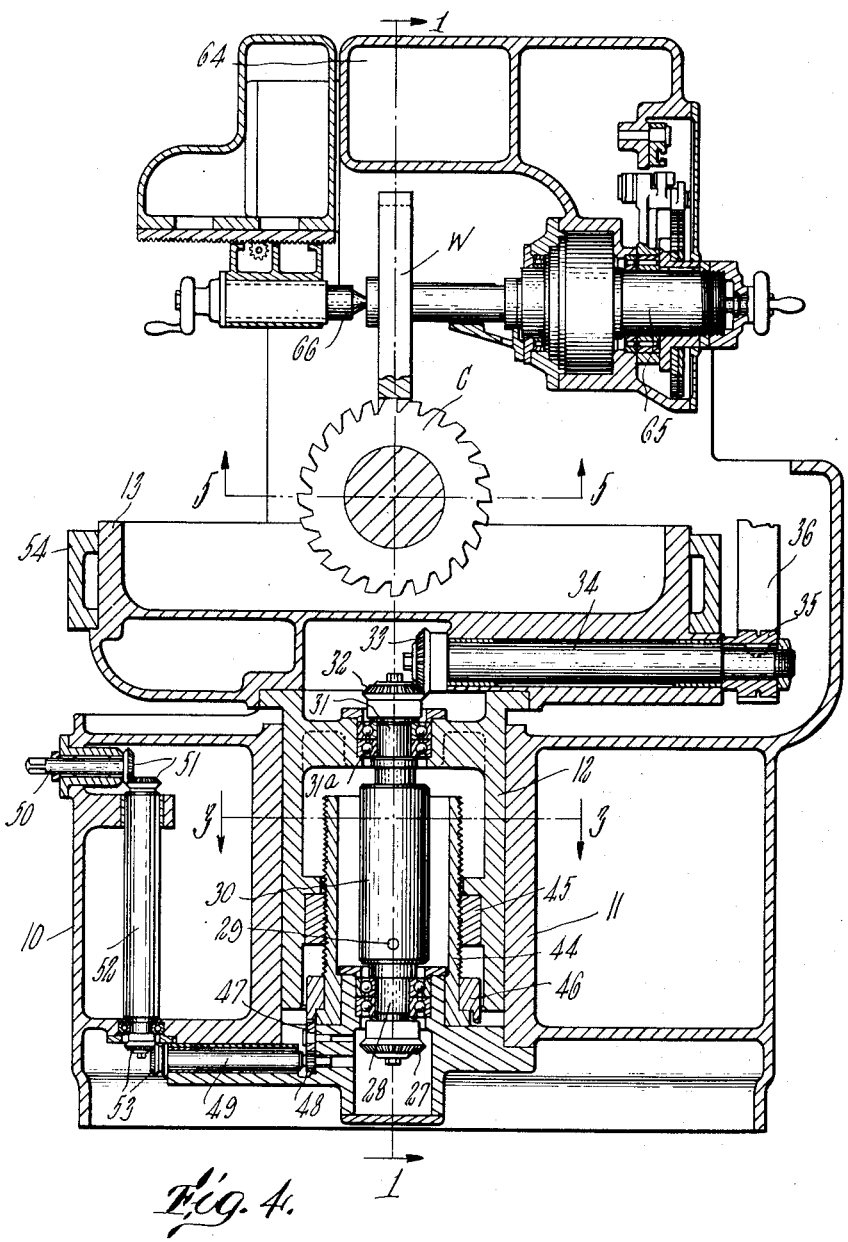
Fig. 4 is a vertical cross section on line 4—4 of Fig. 1.

Shaft 31 is connected by a bevel gear pair 32, 33 with a horizontal shaft 34 (Fig. 4) rotatably carried by the stool or cutter carriage base 13. Shaft 34 carries a pulley or sprocket 35 which is coupled by means of a belt or chain 36 with a pulley or sprocket 37 (Fig. 8) on a shaft 38 journaled in a housing 39. This housing is supported on the stool 13 by a bridge structure 40, a part of which overlies a part of the cutter carriage. Shaft 38 is connected by a coupling 40a with the shaft of a worm 41 rotatably supported in a worm housing 42 which has a sliding engagement with the cutter carriage 16 to permit restraint of the worm by the coupling from endwise movement when the carriage reciprocates. The worm meshes with a worm gear 43 secured to the cutter spindle and of which the diameter of its toothed circumference is equal, or substantially so, to that of the cutter.

Movements for adjustment of the cutter to work pieces of different diameters, and for depth feeding, are given to the stool 13 by a tubular screw 44 (Fig. 4) which is supported rotatably on the machine base coaxial with the telescopic shaft assemblage previously described and surrounds the shaft 28 and sleeve 30. It meshes with an annular nut 45 secured to the interior of the tubular slide 12. A face gear 46 is secured to the screw 44 so as to transmit torque thereto and its teeth mesh with an idle gear 47 in mesh with a gear 48 on a shaft 49. The latter shaft is driven by an actuating shaft 50, a bevel gear pair 51, an upright shaft 52 and a bevel gear pair 53.

Shafts 49, 50 and 52 are rotatably supported by suitably arranged bearings in the machine base 10. Shaft 50 is shown as adapted to be rotated manually by a wrench applied to its squared protruding end. It may, however, be coupled with automatic mechanism for rotating it, and typifies any means for delivering force to mechanism for displacing the cutter toward and away from the locations occupied by work pieces.

The stool 13, which in this machine is of much greater diameter than the slide 12, is steadied and guided by massive key members 53 secured to a band 54, which embraces the largest diameter of the stool, and engaged with stationary guide members 55 secured to the machine base. The ribs and grooves of these key and guide members are parallel to the guideway 11.

The cutter carriage 16 is reciprocated on its guideways 14 and 15 by automatic means, here represented (Fig. 9) as plungers 56 and 57 mounted in hydraulic cylinders 58 and 59, respectively, on the stool 13 in an opposed and alined arrangement which causes them to bear at their protruding ends on abutment surfaces 60 and 61 of the carriage 16. Means for conducting working fluid into and out of the hydraulic cylinders are represented by the ends of pipes 62 and 63. Other means than the hydraulic cylinders and plungers here shown may be employed for the same purpose, the specific means being of secondary importance. Of primary importance is the fact that this machine is equipped with means for reciprocating the cutter in the plane of its rotation so as to give it a feeding travel while cutting. The speed of travel may be established or regulated at any rate suited to the character of the work piece and the depth of cut being made.

Work pieces, one of which is shown at W, are supported above the cutter by a work carriage 64 which in turn is supported on separated uprights 10a and 10b of the machine base and bridges across the space between such uprights in which the cutter is located. A work spindle 65 and dead center 66 on the carriage 64 support the work piece, and the work spindle is rotatable to index the piece after cuts have been made. The carriage may be reciprocated and the work spindle simultaneously rotated at suitable correlated speeds to give a rolling movement to the work with respect to the rim of the cutter of the same character as the movement of a gear rolling along a stationary conjugate rack, the locus of the cutter teeth next to the work piece corresponding to a tooth of such a rack. When the work is so rolled, the surfaces being cut are generated as tooth faces conjugate to the rack tooth form of the cutter. But if the work is held stationary, the grooves or spaces cut are counterparts of the profile of the cutter teeth; and then formed cutters may be used of which the edges may have the contours of a finished gear tooth space, or any other desired contours.

Means by which the carriage may be reciprocated and the work rotated at the same time and indexed periodically are comprehensively shown in my said Patent 2,387,166, to which reference is directed for particulars not here shown. As the present invention involves nothing novel with respect to work holding means, and requires only that the work be supported by some means in operative relation to the cutter, and be indexed when necessary, with or without generative rolling traverse, the extraneous particulars of the prior patented machine have been omitted from the present specification and drawings.

An important novel feature of the invention resides in making the cutter operative on both of its strokes of translative displacement in opposite directions and varying its speeds of rotation in such manner that the speed of its teeth relative to the work (its cutting speed) is substantially or exactly uniform. These results are accomplished by virtue of the relationships between the worm gear 43 and the cutter and worm, and of the work piece to the cutter, previously described.

As the cutter carriage reciprocates, while the worm is prevented from moving endwise, the worm gear rolls on the worm as on a rack, giving increments of angular motion to the cutter spindle in alternately opposite directions which are superimposed on the angular movement imparted by rotation of the worm. In the advancing traverse (that which displaces the cutter in the same direction as that in which its teeth travel while in action on the work piece) such increment is subtracted from the angular motion due to rotation of the worm; and in the opposite (retractive) traverse the increment is added. Thus the increment is negative in the advancing traverse, causing the angular velocity of the spindle to be retarded, and is positive in the retractive traverse, accelerating the spindle. And as the diameter of the cutter is substantially the same as that of the gear, and the work piece is located above the cutter with the part of its surface on which the cutter acts parallel to the axis of the worm, while the worm is correspondingly above the worm gear, these increments of rotation cancel out the effects of the linear displacement of the cutter. If it is assumed that the worm is not rotated while the cutter carriage reciprocates, then it will be at once apparent that the rolling effect of the worm gear on the worm causes the toothed circumference of the cutter to roll axially along the work piece without slip on the pitch circle of its rolling movement and hence without any appreciable cutting action. Hence the rotation of the cutter relative to the work at the cutting location is due wholly and solely to that caused by rotation of the worm, which is independent of the carriage reciprocation and unaffected thereby. The uniformity of cutting speed thus accomplished enables the cutter to operate equally well during its forward and return strokes, whereby a new cut may be taken after each stroke in each direction. Either the cutter may be advanced to greater depth, or the work indexed after each stroke.

Although I have described the cutter and its worm gear as situated below the work piece location and the worm, respectively, it should be understood that this is not a limiting relationship, for the work and worm wheel could be below, or at either side of, the cutter and worm gear, provided both are at the same side, and the cutter carriage be moved correspondingly.

Milling cutters of any conventional or other type can be used as the cutting element of the combination, within the purview of the invention, and so may cutters of other types also, such as grinding wheels.

What I claim is:

1. A machine for cutting notches and grooves in work pieces comprising a supporting structure, a cutter carriage mounted with provision for reciprocation in a prescribed path, a circular cutter mounted rotatably on said carriage with its plane of rotation parallel to said path, a worm gear connected with the cutter to rotate about the same axis therewith and having a toothed circumference substantially equal in diameter to the diameter of the cutter, a worm meshing with said worm gear, means for restraining the worm from endwise movement when the carriage reciprocates, and a work support arranged to hold a work piece in cutting relation to the cutter at the same side of the axis thereof as the worm.

2. A machine for cutting notches or grooves in a work piece, comprising a cutter spindle, a circular cutter and a gear substantially equal to one another in diameter secured to said spindle, a worm meshing with said gear, means for holding a work piece in cutting relation to the cutter at the side thereof corresponding to the side of the gear at which the worm is located, and means for effecting relative reciprocation in a direction perpendicular to the axis of said spindle between the spindle, the cutter and the gear on the one hand, and the work holder and worm on the other hand.

3. A machine for cutting notches or grooves in work pieces, comprising means for supporting a work piece, a cutter carriage mounted to reciprocate in a path parallel to the part of a work piece so supported in which a groove is to be cut, a cutter of disk form rotatably mounted on said carriage to turn about an axis perpendicular to said path and in position to perform a cutting action on the work piece, means for reciprocating the carriage, and means for rotating the cutter, said means including a gear substantially equal in diameter to the cutter, mounted coaxially and in rigid connection therewith, a worm meshing with the gear and located with its axis parallel to the said path, stationary supporting means for said worm, whereby it coacts in the manner of a rack with the gear, and means for rotating the worm.

4. In a machine of the character described, a supporting base, a carriage mounted to reciprocate in a given path on said base, means for reciprocating the carriage, a cutter spindle rotatably mounted on said carriage with its axis perpendicular to the said path, a circular cutter secured to said spindle, a gear of substantially the same diameter as said cutter secured to the spindle, a worm meshing with said gear, holding means for the worm supported by the stool and with which the carriage has sliding engagement, and means for rotating the worm.

5. A gear cutting machine comprising means for supporting a work piece, a cutter carriage mounted to reciprocate in a path substantially parallel to the part of the work piece so supported in which teeth are to be formed, a cutter of disk form rotatably mounted on said carriage to turn about an axis substantially perpendicular to said path in position to perform a cutting action on the work piece, means for reciprocating the carriage, means for rotating the cutter, said means including a gear mounted on the cutter carriage and in driving connection with the cutter, a worm meshing with the gear and located with its axis parallel to said path, supporting means for said worm fixed to said machine, said supporting means holding said worm against lengthwise movement relative to the work whereby it coacts in the manner of a rack with the gear, and means for rotating the worm.

EDWARD W. MILLER.

References Cited in the file of this patent

UNITED STATES PATENTS

| Number | Name | Date |
|---|---|---|
| 1,329,175 | Hackleman | Jan. 27, 1920 |
| 1,584,308 | Konik | May 11, 1926 |
| 2,301,028 | Esch | Nov. 3, 1942 |
| 2,339,630 | Fischer et al. | Jan. 18, 1944 |
| 2,387,166 | Miller | Oct. 16, 1945 |
| 2,405,856 | Schaerer | Aug. 13, 1946 |
| 2,415,801 | Armitage et al. | Feb. 11, 1947 |